(12) United States Patent
Stern et al.

(10) Patent No.: US 12,712,879 B2
(45) Date of Patent: Aug. 18, 2026

(54) NETWORK DEVICE WITH CREDENTIAL-RELATED MESSAGE CONTENT SELECTION FEATURE

(71) Applicant: Roku, Inc., San Jose, CA (US)

(72) Inventors: David Stern, San Jose, CA (US); Greg Garner, Key Colony Beach, FL (US); Robert Caston Curtis, Napa, CA (US); Carl Sassenrath, Reno, NV (US)

(73) Assignee: Roku, Inc., San Jose, CA (US)

( * ) Notice: Subject to any disclaimer, the term of this patent is extended or adjusted under 35 U.S.C. 154(b) by 47 days.

(21) Appl. No.: 18/489,169

(22) Filed: Oct. 18, 2023

(65) Prior Publication Data

US 2025/0133085 A1 Apr. 24, 2025

(51) Int. Cl.
*H04L 29/00* (2006.01)
*H04L 9/40* (2022.01)

(52) U.S. Cl.
CPC .......... *H04L 63/101* (2013.01); *H04L 63/029* (2013.01)

(58) Field of Classification Search
CPC ............................ H04L 63/101; H04L 63/029
USPC ................................................................ 726/4
See application file for complete search history.

(56) References Cited

U.S. PATENT DOCUMENTS

2017/0118210 A1* 4/2017 Athias ................. H04W 12/068
2017/0223591 A1 8/2017 Zalzalah
2019/0068637 A1* 2/2019 Jin ........................ H04W 76/27
2022/0021554 A1 1/2022 Hwang
2022/0303856 A1 9/2022 Chari

* cited by examiner

*Primary Examiner* — Brandon Hoffman
*Assistant Examiner* — Michael D Anderson
(74) *Attorney, Agent, or Firm* — McDonnell Boehnen Hulbert & Berghoff LLP

(57) ABSTRACT

A method includes receiving, by a first device that is included in a first network and a second network, a request from a second device to join the first network. The method also includes making, by the first device, determinations of whether to transmit the second device a first credential corresponding to the first network and whether to transmit the second device a second credential corresponding to the second network. The method also includes using the determinations as a basis to select, as content for a message, the first credential, the second credential, or an indication that the second device is not allowed on the first network and not allowed on the second network. The method also includes transmitting the message that includes the content to the second device.

19 Claims, 9 Drawing Sheets

NETWORK DEVICE WITH CREDENTIAL-RELATED MESSAGE CONTENT SELECTION FEATURE

USAGE AND TERMINOLOGY

In this disclosure, unless otherwise specified and/or unless the particular context clearly dictates otherwise, the terms "a" or "an" mean at least one, and the term "the" means the at least one.

SUMMARY

A first example of the disclosure is a method comprising: receiving, by a first device that is included in a first network and a second network, a request from a second device to join the first network; making, by the first device, determinations of whether to transmit the second device a first credential corresponding to the first network and whether to transmit the second device a second credential corresponding to the second network; using the determinations as a basis to select, as content for a message, the first credential, the second credential, or an indication that the second device is not allowed on the first network and not allowed on the second network; and transmitting the message that includes the content to the second device.

A second example of the disclosure is a non-transitory computer readable medium storing instructions that, when executed by one or more processors of a first device, cause the first device to perform the method of the first example.

A third example of the disclosure is a device comprising: one or more processors; and a computer readable medium storing instructions that, when executed by the one or more processors, cause the device that is included in a first network and a second network to perform the method of the first example.

A fourth example of the disclosure is a method comprising: receiving, by a server, a request from a first device for a second device to join a first network, wherein the first device is included in the first network and in a second network; making, by the server, determinations of whether to transmit the second device a first credential corresponding to the first network and whether to transmit the second device a second credential corresponding to the second network; using the determinations as a basis to select, as content for a message, the first credential, the second credential, or an indication that the second device is not allowed on the first network and not allowed on the second network; and transmitting, to the first device, an instruction to transmit the message that includes the content.

A fifth example of the disclosure is a non-transitory computer readable medium storing instructions that, when executed by one or more processors of a server, cause the server to perform the method of the fourth example.

A sixth example of the disclosure is a server comprising: one or more processors; and a computer readable medium storing instructions that, when executed by the one or more processors, cause the server to perform the method of the fourth example.

The features, functions, and advantages that have been discussed can be achieved independently in various examples or may be combined in yet other examples further details of which can be seen with reference to the following description and drawings.

DETAILED DESCRIPTION

Figure 1:
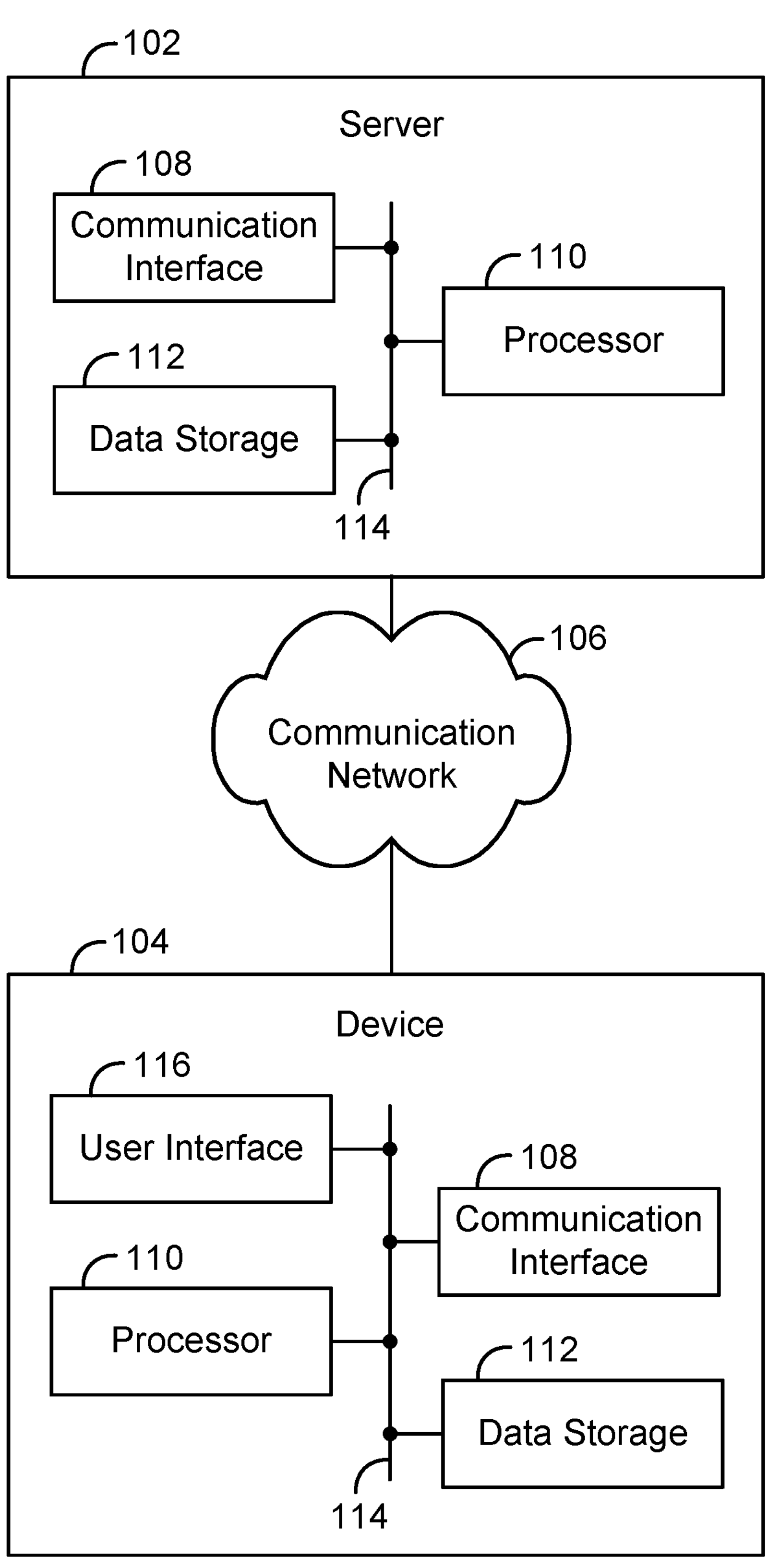
FIG. 1 is a block diagram of a server and a device, according to an example.

Adding a smart device such as a Wi-Fi-enabled light bulb or a Wi-Fi-enabled electrical outlet to a wireless network can be tedious. For example, a user may have to establish a Bluetooth® connection between the user's smart phone and the smart device. Next, the user may be required to use a touch screen keyboard to provide the password of the wireless network so that the smart phone can provide the password to the smart device via the Bluetooth® connection. This requires the user to have access to a smart phone and requires that the user know or have access to the password for the wireless network. If the password is complicated, the user may need several attempts to enter the password correctly, even if the user has access to the password. Less tedious methods for adding the smart device can leave the network vulnerable to unauthorized users. Thus, convenient and secure methods for adding smart devices to a wireless network are needed.

This disclosure includes methods and systems that facilitate adding a smart device to one or more wireless networks. These methods and systems can be less tedious and less vulnerable to unauthorized users than conventional methods and systems.

For example, a first device is included in a first network and a second network. The first device could be a smart light bulb, the first network could be a Wi-Fi network, and the second network could be a proprietary mesh network established by the manufacturer of the first device. Thus, the second network can include multiple devices produced by the same manufacturer. The devices of the second network can communicate with each other directly via the second network without a gateway. The first network generally includes all of the devices of the second network and some additional devices (e.g., printers, computers, etc.) that are not produced by the manufacturer associated with the second network. Both networks typically use a gateway such as a router to communicate with the internet.

In operation, the first device receives a request from a second (e.g., unknown) device to join the first network. Generally, the request will include a unique identifier of the second device such as a media access control (MAC) address. The first device determines whether to transmit, to the second device, a first credential corresponding to the first network and/or a second credential corresponding to the second network. For example, the first device transmits the identifier of the second device to a server via the internet and receives from the server instructions regarding which credentials, if any, to provide to the second device. In other examples, the first device determines which credentials to send to the second device based on the signal strength of the request detected by the first device or based on whether proof of possession of the first device is verified by user input received by the first device. The first device then selects content for a message based on the results of the aforementioned determinations and transmits the message to the second device. In various examples, the message includes one or both of the first credential or the second credential, or an indication that the second device is not allowed on the first network and not allowed on the second network.

In some examples, the server receives from the first device the request for the second device to join the first network. Generally, the request includes the identifier of the second device. The server can determine whether the second device should receive one, both, or neither of the first credential or the second credential in multiple ways. For example, the server can determine that the second device was purchased using an account that is associated with the first device, the first network, and/or the second network and responsively instruct the first device to provide the first credential and/or the second credential. In contrast, if the server determines that the second device is a cloned device or that the second device transmitted a quantity of requests to join distinct networks that exceeds a threshold quantity, the server can instruct the first device to send the indication that the second device is not allowed on the first network and not allowed on the second network.

Disclosed examples will now be described more fully hereinafter with reference to the accompanying Drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

FIG. 1 is a block diagram of a server 102 and a device 104 with which aspects of the present disclosure can be implemented.

The server 102 is configured for performing a variety of functions, such as those described in this disclosure (including the accompanying drawings). For example, the server 102 is configured for communicating with the device 104 via the communication network 106.

The server 102 may take a variety of forms and may include various components, including for example, a communication interface 108, a processor 110, and a data storage 112, all of which may be communicatively linked to each other via a system bus, network, or other connection mechanism 114.

The communication interface 108 may take a variety of forms and is configured to allow the server 102 to communicate with one or more devices according to any number of protocols. For instance, the communication interface 108 is configured to allow the server 102 to communicate with the device 104 via the communication network 106. In one example, the communication interface 108 may take the form of a wired interface, such as an Ethernet interface. As another example, the communication interface 108 may take the form of a wireless interface, such as a cellular or Wi-Fi interface.

The processor 110 may include a general purpose processor (e.g., a microprocessor) and/or a special purpose processor (e.g., a digital signal processors (DSP)).

The data storage 112 may include one or more volatile, non-volatile, removable, and/or non-removable storage components, such as magnetic, optical, or flash storage, and may be integrated in whole or in part with the processor 110. Further, the data storage 112 may take the form of a non-transitory computer-readable storage medium, having stored thereon program instructions (e.g., compiled or non-compiled program logic and/or machine code) that, when executed by the processor 110, cause the server 102 to perform one or more functions, such as those described in this disclosure.

Likewise, the device 104 is configured for performing a variety of functions such as those described in this disclosure.

The device 104 may take a variety of forms, including for example, a smart light bulb, a smart electrical outlet, an internet-enabled camera, an internet-enabled doorbell, etc. The device 104 may include various components, including for example, a user interface 116, the communication interface 108, the processor 110, and the data storage 112, all of which may be communicatively linked with each other via a system bus, network, or other connection mechanism 114.

The user interface 116 is configured for facilitating interaction between the device 104 and a user of the device 104, such as by receiving input from the user and providing output to the user. Thus, the user interface 116 may include input components such as a keyboard or a push button. In addition, the user interface 116 may include output components such as a sound speaker or other audio output mechanism.

The data storage 112 may include one or more volatile, non-volatile, removable, and/or non-removable storage components, and may be integrated in whole or in part with the processor 110. Further, the data storage 112 may take the form of a non-transitory computer-readable storage medium, having stored thereon program instructions that, when executed by the processor 110, cause the device 104 to perform one or more functions, such as those described in this disclosure.

Generally, the communication network 106 is configured to allow the server 102 and the device 104 to communicate with each other using any number of protocols. In addition, the communication network 106 may take a variety of forms, including for example a packet-switched network such as the Internet.

Figure 2:
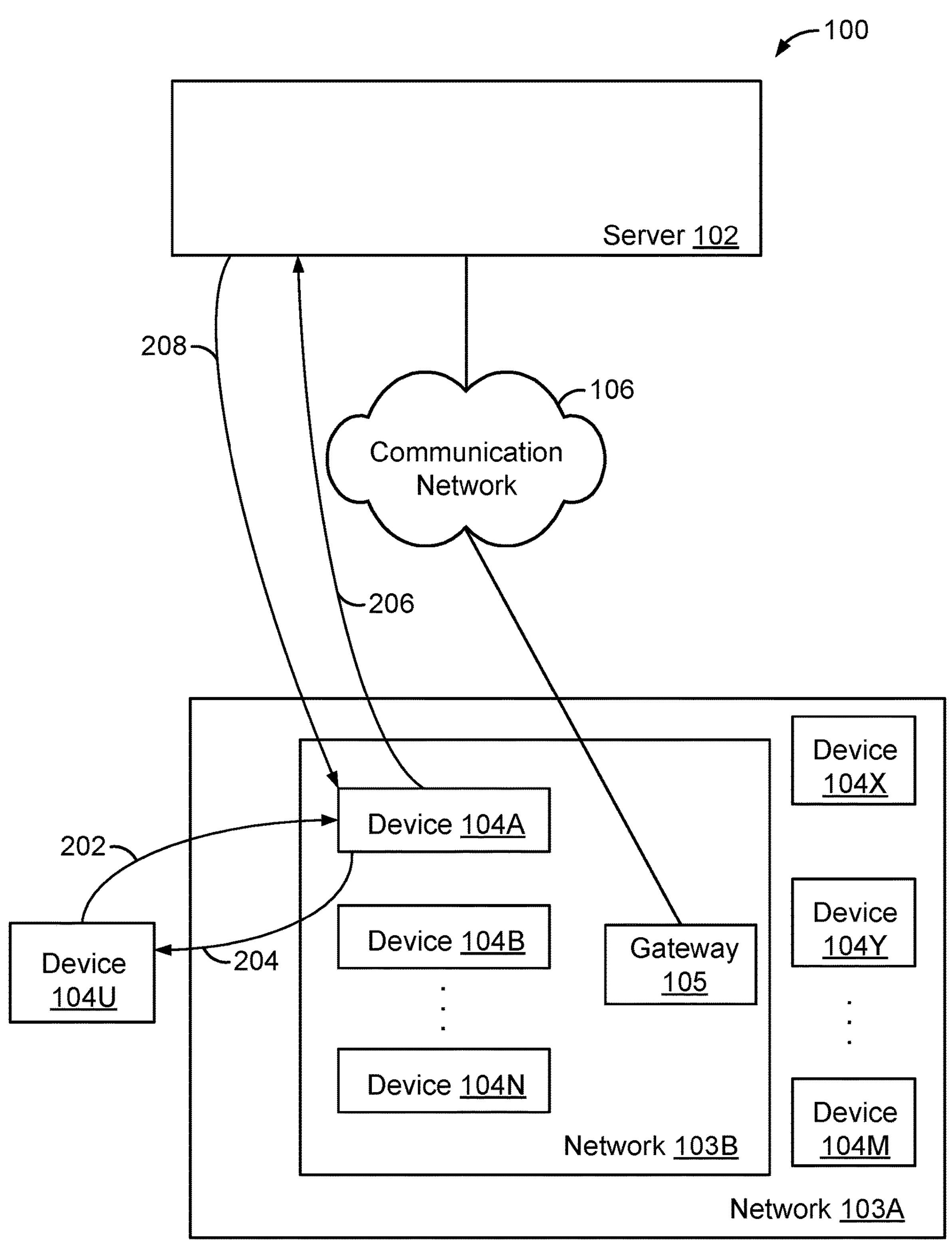
FIG. 2 is a block diagram of system that includes a server and several devices, according to an example.

FIG. 2 is a block diagram of system 100 that includes the server 102, several devices 104, a gateway 105, the communication network 106, a network 103A, and a network 103B.

The server 102 is in communication with the network 103A and the network 103B via the communication network 106 and the gateway 105. The gateway 105 can include a modem and/or router, for example.

The network 103B is a proprietary mesh network established by the manufacturer of the devices 104A-N. The network 103B includes the gateway 105 and devices 104A-N. In addition to the gateway 105 and the devices 104A-N (e.g., the devices of the network 103B), the network 103A includes devices 104X-M. The network 103A is a Wi-Fi network.

The device 104U is an unknown device similar to the devices 104A-N but is not included in the network 103A or the network 103B. The devices 104A-N are generally smart devices such as internet-enabled light bulbs or speakers produced by the same manufacturer and are in communication with each other via the network 103B. The devices 104X-M are generally not made by that manufacturer and can include printers, computers, smart phones etc.

In operation, the device 104A receives a request 202 from the device 104U for the device 104U to join the network 103A and/or the network 103B. Generally, the request 202 includes a unique identifier of the device 104U such as a media access control (MAC) address or a private key.

Next, the device 104A determines whether to transmit, to the device 104U, a credential corresponding to the network 103A and/or a credential corresponding to the network 103B. In some examples, the device 104A determines which, if any, credentials to transmit to the device 104U by communicating with the server 102.

For example, the device 104A transmits the identifier of the device 104U as part of the request 206 to the server 102 via the gateway 105 and the communication network 106. Next, the device 104A receives from the server 102, via the gateway 105 and the communication network 106, instructions 208 regarding which credentials, if any, to transmit to the device 104U.

In some examples, the device 104A receives the instruction 208 from the server 102 to transmit the credential corresponding to the network 103A and the credential corresponding to the network 103B. As such, the device 104A uses the instruction 208 to the make the determination to transmit, to the device 104U, the credential corresponding to the network 103A and the credential corresponding to the network 103B. Accordingly, the device 104A selects the credential corresponding to the network 103A and the credential corresponding to the network 103B for inclusion in the message 204. Then, the device 104A transmits the message including the credential corresponding to the network 103A and the credential corresponding to the network 103B to the device 104U. As a result, the device 104U is able to access the network 103A and the network 103B.

In some examples, the device 104A receives the instruction 208 from the server 102 to transmit the credential corresponding to the network 103B but not the credential corresponding to the network 103A. As such, the device 104A uses the instruction 208 to the make the determination to transmit, to the device 104U, the credential corresponding to the network 103B but not the credential corresponding to the network 103A. Accordingly, the device 104A selects the credential corresponding to the network 103B but not the credential corresponding to the network 103A for inclusion in the message 204. Then, the device 104A transmits the message including the credential corresponding to the network 103B but not the credential corresponding to the network 103A to the device 104U. As a result, the device 104U is able to access the network 103B but not the network 103A.

The device 104A may make an additional determination that a threshold duration (e.g., 1 hour) has elapsed since transmitting the message 204 without receiving a second instruction 208 from the server 102 to transmit the credential corresponding to the network 103A to the device 104U. As a result, the device 104A changes the credential corresponding to the network 103B in response to making the additional determination, for example by instructing the gateway 105 and/or the devices 104B-N to change the credential corresponding to the network 103B. This functionality allows the device 104U to have temporary access to the network 103B while the server 102 obtains additional information regarding whether the device 104U should also have access to the network 103A and/or should continue to have access to the network 103B.

In some examples, the device 104A receives the instruction 208 from the server 102 to transmit neither the credential corresponding to the network 103A nor the credential corresponding to the network 103B. As such, the device 104A uses the instruction 208 to the make the determination to transmit, to the device 104U, neither the credential corresponding to the network 103A nor the credential corresponding to the network 103B. Accordingly, the device 104A selects the indication that the device 104U is not allowed on the network 103A and is not allowed on the network 103B for inclusion in the message 204. The device 104A transmits the message 204 in the form of the indication that the device 104U is not allowed on the network 103A and is not allowed on the network 103B. As a result, the device 104U continues to not be able to access the network 103A or the network 103B.

In other examples, the device 104A determines which credentials, if any, to send to the device 104U based on the signal strength of the request 202 detected by the device 104A. For example, if the device 104A determines that a signal strength of the request 202 detected by the device 104A exceeds a threshold signal strength (e.g., −50 dBm), the device 104A selects the credential corresponding to the network 103A and/or the credential corresponding to the network 103B for inclusion in the message 204. Accordingly, the device 104A transmits the message 204 to the device 104U including the credential corresponding to the network 103A and/or the credential corresponding to the network 103B.

On the other hand, if the device 104A determines that the signal strength of the request 202 detected by the device 104A does not exceed the threshold signal strength, the device 104A transmits the message 204 to the device 104U in the form of the indication that the device 104U is not allowed on the network 103A and is not allowed on the network 103B. In these examples, strong signal strength (e.g., proximity to the device 104A) serves as a proxy for physical possession of the device 104A, which indicates that the request 202 is legitimate.

In other examples, the device 104A receives an input via the user interface 116 of the device 104A and responsively selects the credential corresponding to the network 103A and/or the credential corresponding to the network 103B for inclusion in the message 204 based on receiving the input. Accordingly, the device 104A transmits the message 204 to the device 104U including the credential corresponding to the network 103A and/or the credential corresponding to the network 103B. The input received by the device 104A acts as a proxy for proof of physical possession of the device 104A which indicates that the request 202 is legitimate.

The server 102 performs functionality that complements the functionality of the device 104A described above. In some examples, the server 102 receives, from the device 104A, the request 206 for the device 104U to join the network 103A and/or the network 103B. The request 206 generally includes the identifier of the device 104U. The server 102 then determines whether the device 104A should transmit to the device 104U one, both, or neither of the credential corresponding to the network 103A or the credential corresponding to the network 103B. The server 102 also uses the determinations as a basis to select, as content for the message 204, the credential corresponding to the network 103A, the credential corresponding to the network 103B, or the indication that the device 104U is not allowed on the network 103A and not allowed on the network 103B. Finally, the server 102 transmits, to the device 104A, the instruction 208 to transmit the message 204 that includes the selected content.

For example, the server 102 determines that the device 104U was purchased using an account that is associated with the server 102, the device 104A, the network 103A, and/or the network 103B. The server 102 can make that determination based on purchase records, the identifier, and information related to the network 103A and/or the network 103B stored by the server 102. Based on the determination, the server 102 responsively selects the credential corresponding to the network 103A and/or the credential corresponding to the network 103B for inclusion in the message 204. Lastly, the server 102 transmits, to the device 104A, the instruction 208 to transmit the message 204 that includes the credential corresponding to the network 103A and/or the credential corresponding to the network 103B.

In other examples, the server 102 determines that the device 104U is a cloned device, and the server 102 responsively selects for inclusion in the message 204 the indication that the device 104U is not allowed on the network 103A and not allowed on the network 103B. Thus, the server 102 then transmits the instruction 208 to the device 104A to transmit the indication that the device 104U is not allowed on the network 103A and not allowed on the network 103B. For example, the server 102 determines that the device 104U is a cloned device based on receiving contemporaneous requests to join distinct or geographically separated networks from devices purporting to be the device 104U or by detecting other network activity that indicates the device 104U is a cloned device.

In other examples, the server 102 determines that the device 104U transmitted a quantity of requests to join distinct networks that exceeds a threshold quantity (e.g., 5 requests to join 5 distinct networks in a single day), and the server 102 responsively selects for inclusion in the message 204 the indication that the device 104U is not allowed on the network 103A and not allowed on the network 103B. Thus, the server 102 then transmits the instruction 208 to the device 104A to transmit the indication that the device 104U is not allowed on the network 103A and not allowed on the network 103B.

Figure 3A:
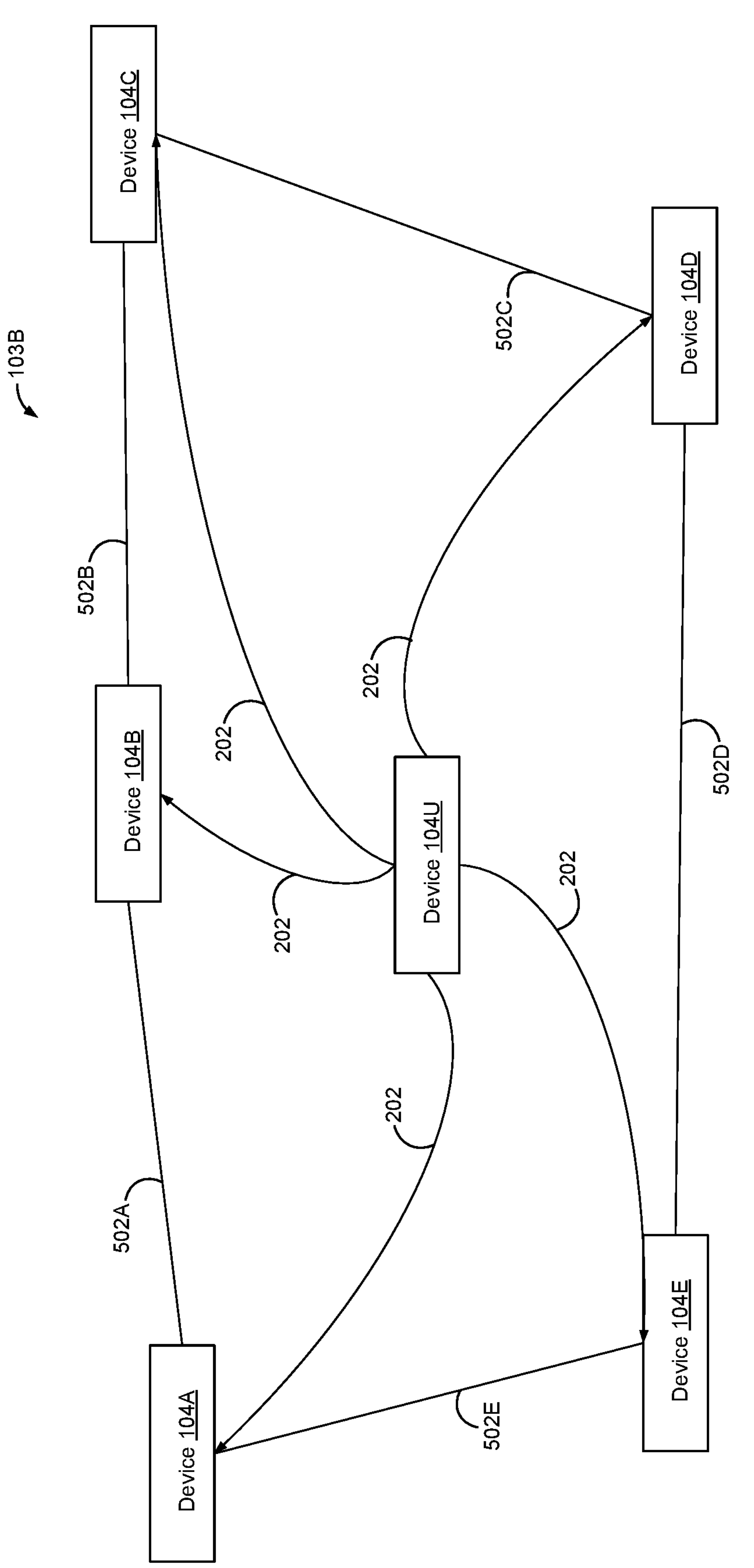
FIG. 3A is a schematic diagram of a network of devices, according to an example.
Figure 3B:
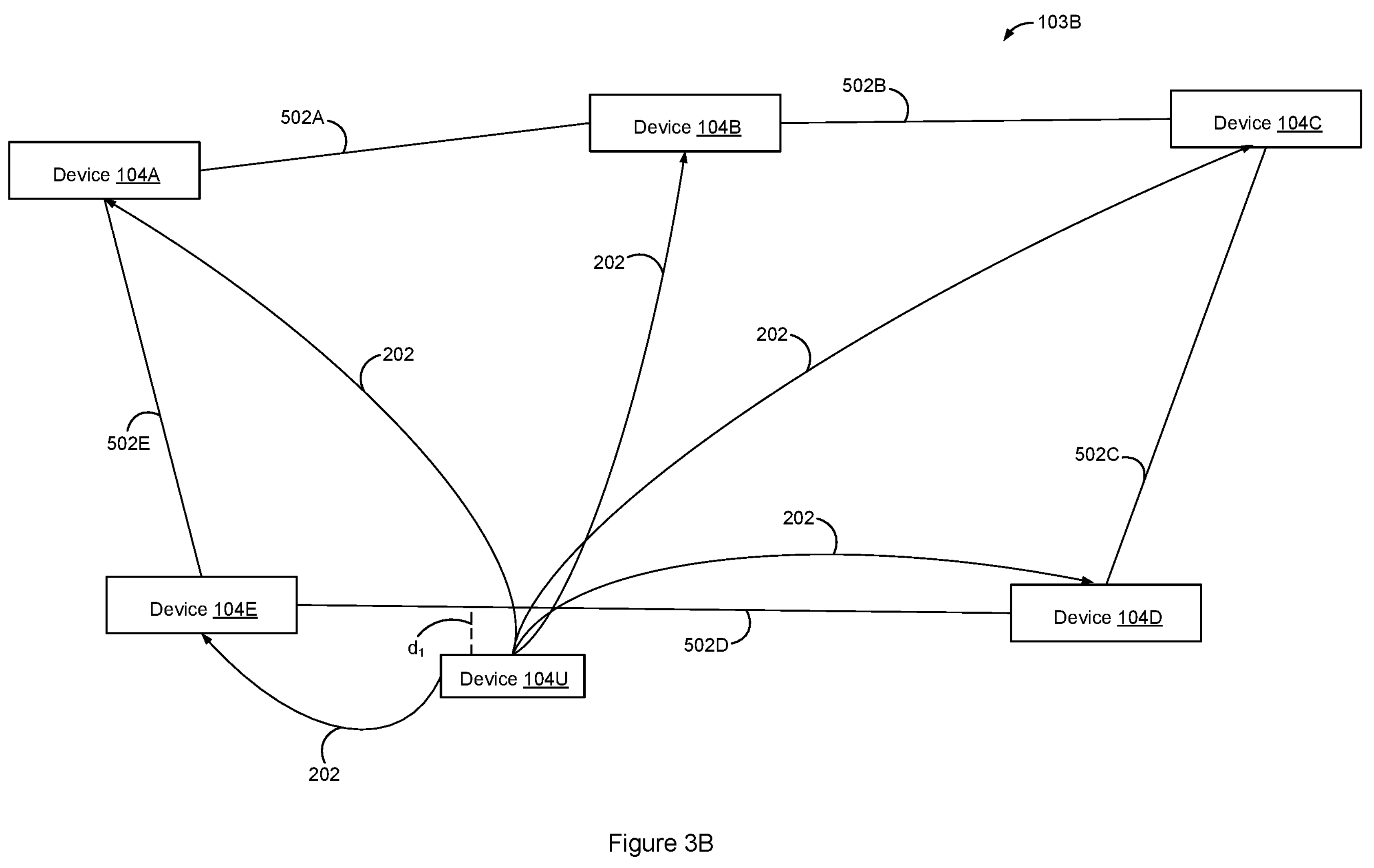
FIG. 3B is a schematic diagram of a network of devices, according to an example.
Figure 3C:
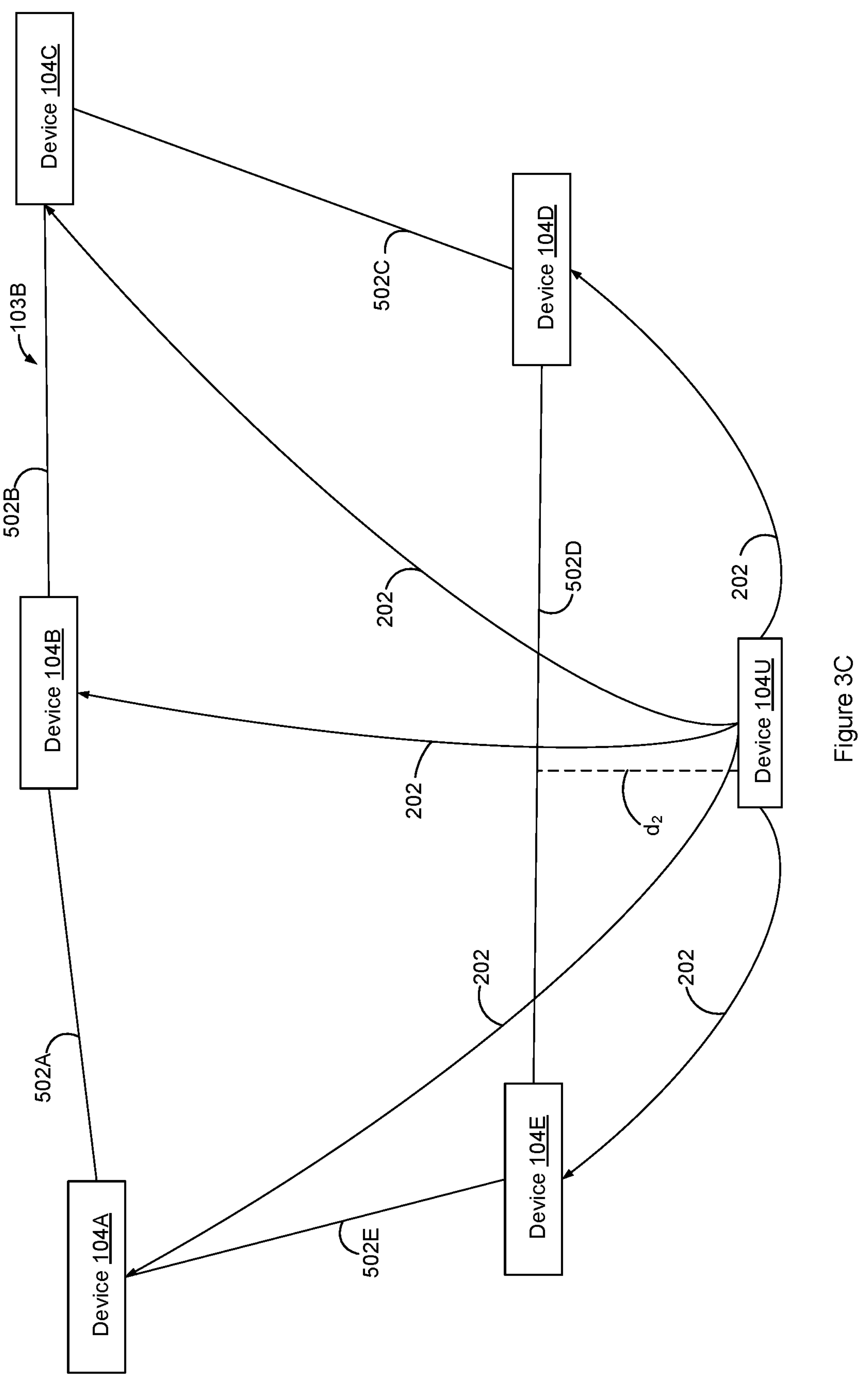
FIG. 3C is a schematic diagram of a network of devices, according to an example.

FIG. 3A, FIG. 3B, and FIG. 3C are schematic diagrams depicting example locations of the device 104A, the device 104B, the device 104C, the device 104D, the device 104E, and the device 104U. In some examples, the devices 104-E and the device 104U are within the same plane, but in other examples the devices 104-E and the device 104U are not within the same plane. The boundary 502A is a straight line between the device 104A and the device 104B, the boundary 502B is a straight line between the device 104B and the device 104C, the boundary 502C is a straight line between the device 104C and the device 104D, the boundary 502D is a straight line between the device 104D and the device 104E, and the boundary 502E is a straight line between the device 104E and the device 104A. In various examples, the boundary 502A, the boundary 502B, the boundary 502C, the boundary 502D, and the boundary 502E, define a polyhedron or a polygon. As described below, the device 104A can use channel state information (CSI) collected by the devices 104A-E pertaining to the device 104U to determine whether the device 104U should be provided credentials for the network 103A and/or the network 103B.

In FIG. 3A, the device 104U is surrounded by the devices 104A-E. That is, the device 104U is within a polygon or a polyhedron defined by the boundaries 502A-E. In FIG. 3B, the device 104U is not surrounded by the devices 104A-E. That is, the device 104U is outside of a polygon or a polyhedron defined by the boundaries 502A-E by a distance $d_1$. In FIG. 3C, the device 104U is not surrounded by the devices 104A-E. That is, the device 104U is outside of a polygon or a polyhedron defined by the boundaries 502A-E by a distance $d_2$ that is larger than $d_1$.

In some examples, one or more of the devices 104A-E receives the request 202 from the device 104U for the device 104U to join the network 103A and/or the network 103B. In many cases, some of the devices 104A-E receive the same request 202 multiple times. That is, the request 202 reflects from or transmits through objects such as furniture, interior walls, exterior walls, people, appliances, the earth, floors, and the like. This can result in the request 202 arriving at the same device (e.g., the same antenna) via multiple paths which generally results in the request 202 arriving at that device multiple times non-simultaneously. This is an aspect of the multipath phenomenon.

As such, the devices 104A-E detect multiple instances of the request 202 at multiple non-simultaneous instants in time. The devices 104B-E each send timestamps corresponding to each time that particular device received an instance of the request 202. The device 104A determines the location of the device 104U using known locations of the devices 104A-E, the timestamps corresponding to each time the devices 104A-E received an instance of the request 202, and CSI algorithms. Then, the device 104A selects which credentials, if any, to send to the device 104U based on the location of the device 104U determined via the CSI algorithms.

In FIG. 3A, the device 104A determines that the device 104U is surrounded by the devices 104A-E and/or is within a polygon or a polyhedron defined by the boundaries 502A-E. As a result, the device 104A selects both the credential corresponding to the network 103A and the credential corresponding to the network 103B for inclusion in the message 204 and sends the message 204 to the device 104U accordingly.

In FIG. 3B, the device 104A determines that the device 104U is not surrounded by the devices 104A-E and/or is outside of a polygon or a polyhedron defined by the boundaries 502A-E by a distance $d_1$. The device 104A further determines that the distance $d_1$ is less than a threshold distance such as 10 meters. As a result, the device 104A selects both the credential corresponding to the network 103A and the credential corresponding to the network 103B for inclusion in the message 204 and sends the message 204 to the device 104U accordingly.

In other examples represented by FIG. 3B, the device 104A selects the credential corresponding to the network 103B but not the credential corresponding to the network 103A for inclusion in the message 204 and sends the message 204 to the device 104U accordingly, as a result of determining that the distance $d_1$ is less than the threshold distance.

In FIG. 3C, the device 104A determines that the device 104U is not surrounded by the devices 104A-E and/or is outside of a polygon or a polyhedron defined by the boundaries 502A-E by a distance $d_2$. The device 104A further determines that the distance $d_2$ is greater than or equal to the threshold distance such as 10 meters. As a result, the device 104A selects neither the credential corresponding to the network 103A nor the credential corresponding to the network 103B for inclusion in the message 204 and sends the message 204 to the device 104U accordingly. That is, the message 204 includes the indication that the device 104U is not allowed on the network 103A and is not allowed on the network 103B.

Figure 4:
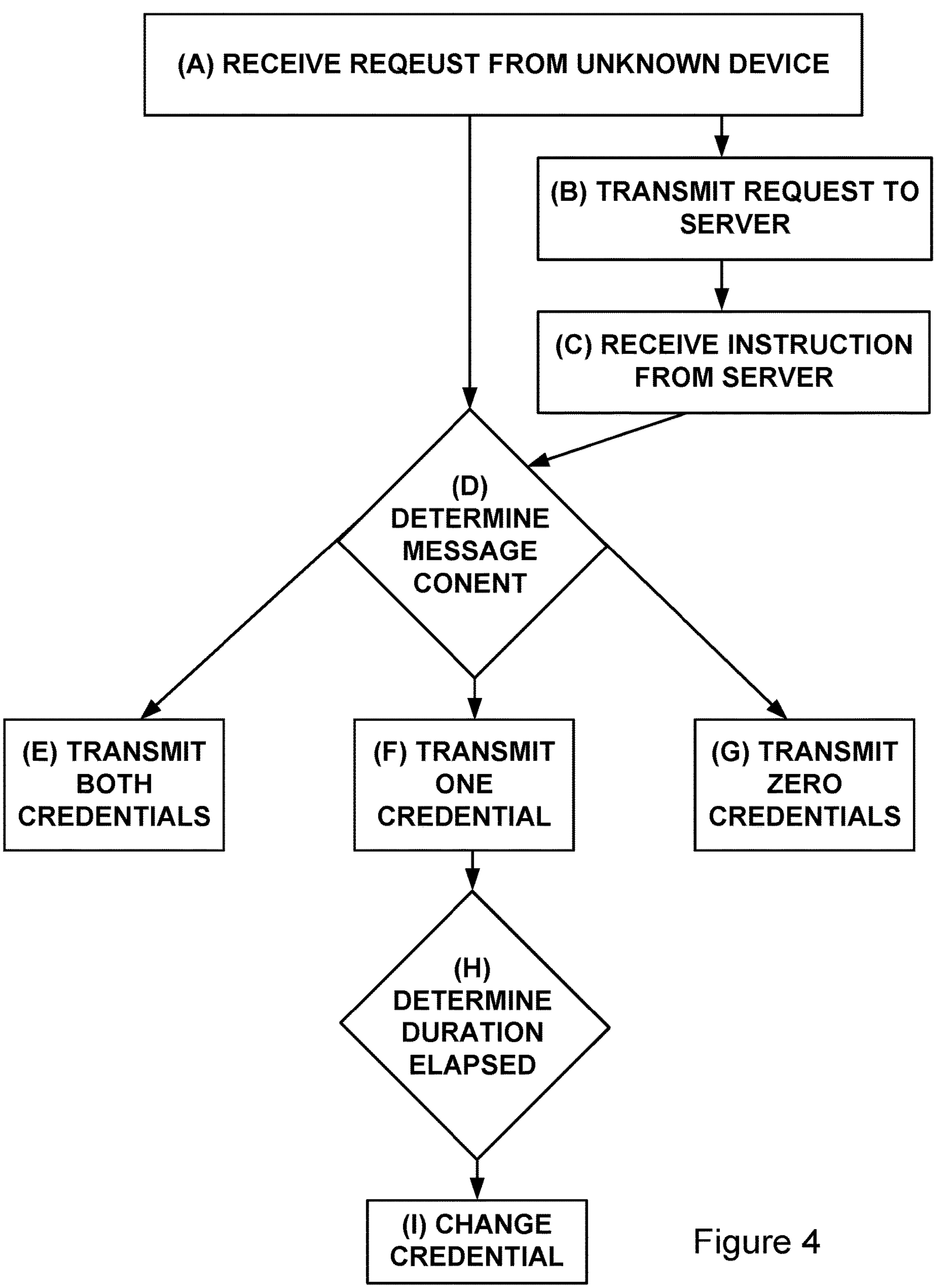
FIG. 4 is a flow chart of methods performed by a device, according to an example.

FIG. 4 is a flow chart of methods performed by the device 104A. At block A, the device 104A receives the request 202 from the device 104U for the device 104U to join the network 103A and/or the network 103B.

At block B, the device 104A transmits the request 206 for the device 102U to join the network 103A and/or the network 103B to the server 102. The request 206 can include the identifier of the device 140U.

At block C, the device 104A receives the instruction 208 from the server 102 to transmit the credential corresponding to the network 103A, the credential corresponding to the network 103B, or the indication that the device 104U is not allowed on the network 103A and not allowed on the network 103B.

Block D follows block A or block C in various examples. At block D, the device 104A makes determinations of whether to transmit the device 104U the credential corresponding to the network 103A and whether to transmit the device 104U the credential corresponding to the network 103B. These determinations are performed based on the instruction 208, based on the signal strength of the request 202, based on the determined location of the device 104U relative to the devices 104A-E, or based on receiving input via the user interface 116.

Block E follows block D when the device 104A determines to transmit both the credential corresponding to the network 103A and the credential corresponding to the network 103B to the device 104U. At block E, the device 104A selects both the credential corresponding to the network 103A and the credential corresponding to the network 103B for inclusion in the message 204 and transmits the message 204 to the device 104U accordingly.

Block F follows block D when the device 104A determines to transmit the credential corresponding to the network 103B but not the credential corresponding to the network 103A to the device 104U. At block F, the device 104A selects the credential corresponding to the network 103B but not the credential corresponding to the network 103A for inclusion in the message 204 and transmits the message 204 to the device 104U accordingly.

Block G follows block D when the device 104A determines to transmit neither the credential corresponding to the network 103A nor the credential corresponding to the network 103B to the device 104U. At block G, the device 104A selects the indication that the device 104U is not allowed on the network 103A and not allowed on the network 103B for inclusion in the message 204 and transmits the message 204 to the device 104U accordingly.

Block H follows block F. At block H, the device 104A makes an additional determination that a threshold duration has elapsed since transmitting the message 204 without receiving a second instruction from the server 102 to transmit the credential corresponding to the network 103A to the device 104U.

Block I follows block H. At block I, the device 104A changes the credential corresponding to the network 103B in response to making the additional determination of block H.

Figure 5:
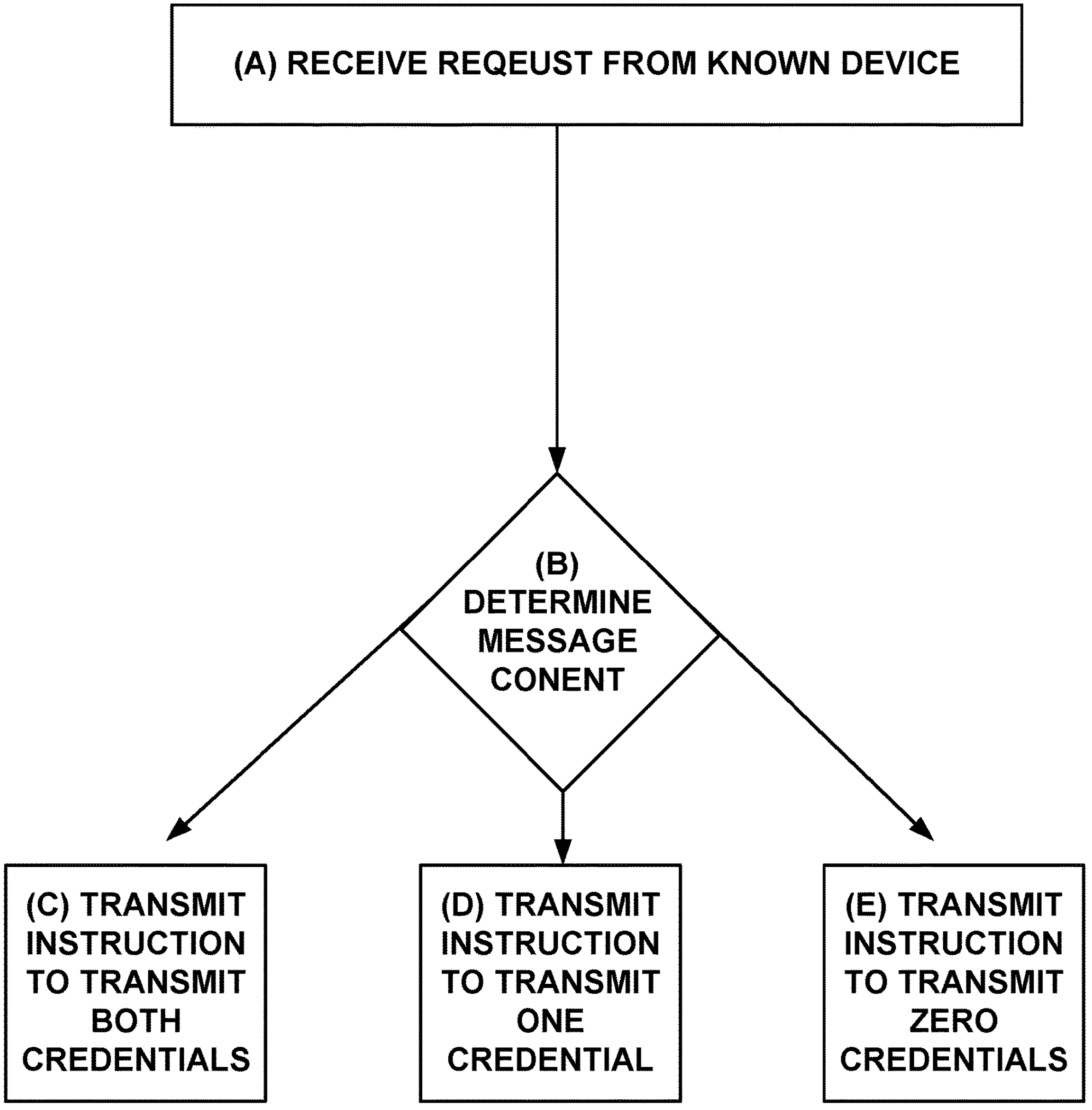
FIG. 5 is a flow chart of methods performed by a server, according to an example.

FIG. 5 is a flow chart of a method performed by the server 102. At block A, the server 102 receives the request 206 from the device 104A for the device 104U to join the network 103A and/or the network 103B. The request 206 can include the identifier of the device 104U.

At block B, the server 102 makes determinations of whether to transmit the device 104U the credential corresponding to the network 103A and whether to transmit the device 104U the credential corresponding to the network 103B. The server 102 also uses the determinations as a basis to select, as content for the message 204, the credential corresponding to the network 103A, the credential corresponding to the network 103B, or the indication that the device 104U is not allowed on the network 103A and not allowed on the network 103B. The server 102 makes these determinations based on determining whether the device 104U was purchased using an account that is associated with the device 104A, the network 103A, and/or the network 103B, based on determining that the device 104U is a cloned device based on analyzing network activity, and/or based on determining that the device 104U transmitted a quantity of requests to join distinct networks that exceeds a threshold quantity.

Block C follows block B when the server 102 selects both the credential corresponding to the network 103A and the credential corresponding to the network 103B for inclusion in the message 204. At block C, the server 102 transmits to the device 104A the instruction 208 to transmit the message 204 that includes the content in the form of both the credential corresponding to the network 103A and the credential corresponding to the network 103B.

Block D follows block B when the server 102 selects the credential corresponding to the network 103B but not the credential corresponding to the network 103A for inclusion in the message 204. At block D, the server 102 transmits to the device 104A the instruction 208 to transmit the message 204 that includes the content in the form of the credential corresponding to the network 103B but not the credential corresponding to the network 103A.

Block E follows block B when the server 102 selects the indication that the device 104U is not allowed on the network 103A and not allowed on the network 103B for inclusion in the message 204. At block E, the server 102 transmits to the device 104A the instruction 208 to transmit the message 204 that includes the content in the form of the indication that the device 104U is not allowed on the network 103A and not allowed on the network 103B.

Figure 6:
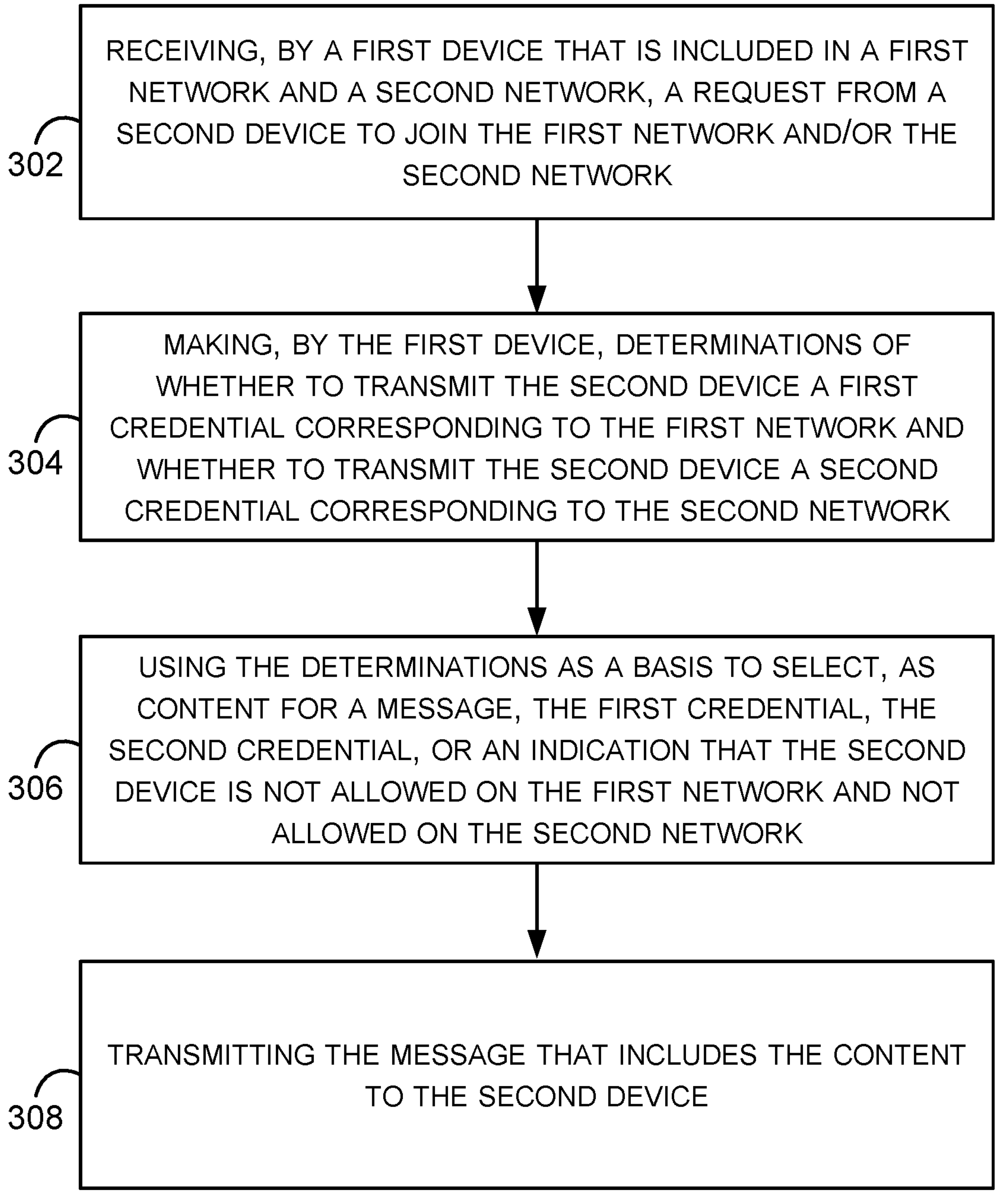
FIG. 6 is a block diagram of a method, according to an example.
Figure 7:
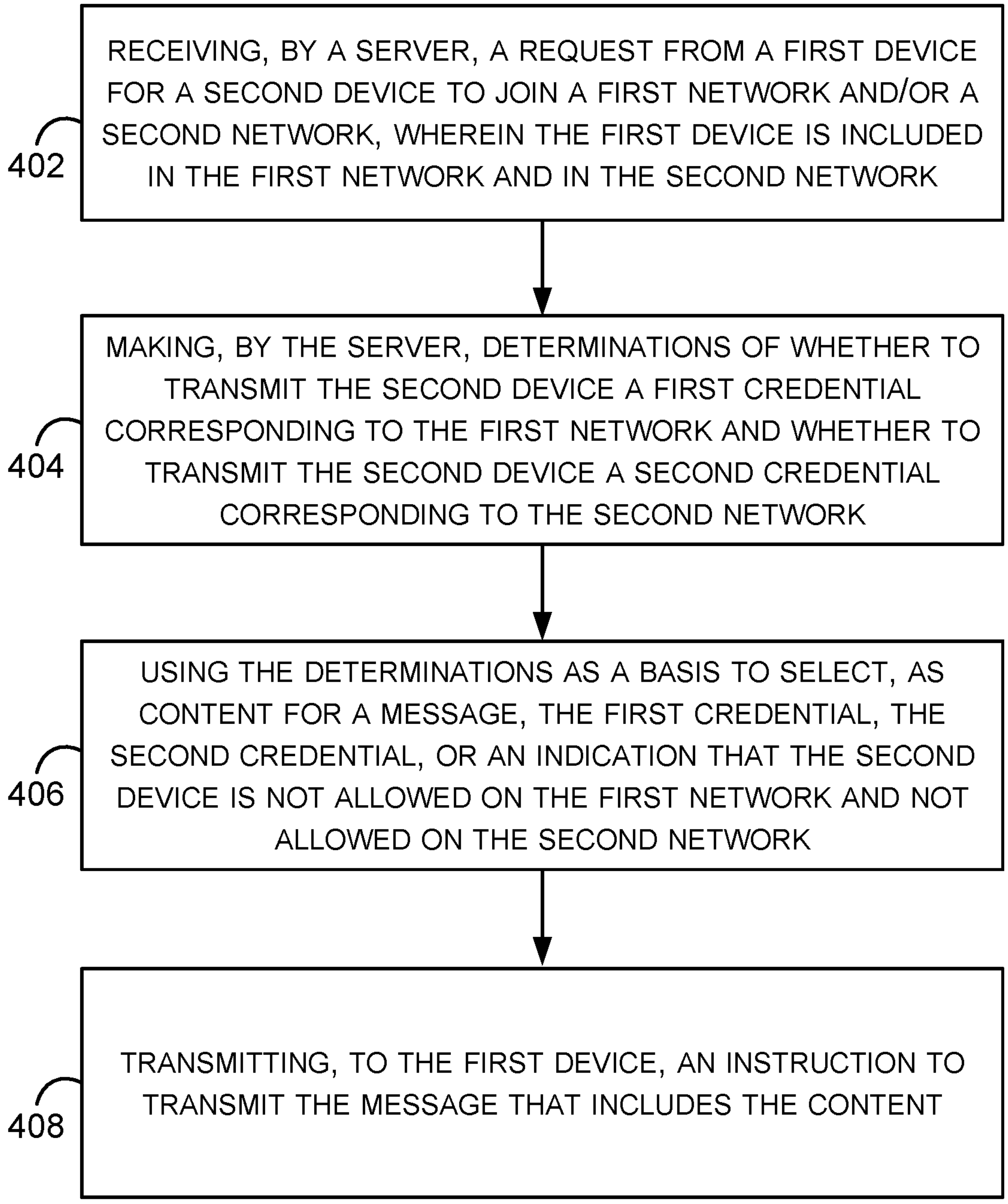
FIG. 7 is a block diagram of a method, according to an example.

FIG. 6 is a block diagram of a method 300 of operating the device 104A and FIG. 7 is a method 400 of operating the server 102. As shown in FIG. 6 and FIG. 7, the method 300 and the method 400 include one or more operations, functions, or actions as illustrated by blocks 302, 304, 306, 308, 402, 404, 406, and 408. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

At block 302, the method 300 includes receiving, by the device 104A that is included in the network 103A and the network 103B, the request 202 from the device 104U to join the network 103A and/or the network 103B. Functionality related to block 302 is discussed above with reference to FIG. 2, FIGS. 3A-C, and FIG. 4.

At block 304, the method 300 includes making, by the device 104A, determinations of whether to transmit the device 104U the credential corresponding to the network 103A and whether to transmit the device 104U the credential corresponding to the network 103B. Functionality related to block 304 is discussed above with reference to FIG. 2, FIGS. 3A-C, and FIG. 4.

At block 306, the method 300 includes using the determinations as a basis to select, as content for the message 204, the credential corresponding to the network 103A, the credential corresponding to the network 103B, or an indication that the device 104U is not allowed on the network 103A and not allowed on the network 103B. Functionality related to block 306 is discussed above with reference to FIG. 2, FIGS. 3A-C, and FIG. 4.

At block 308, the method 300 includes transmitting the message 204 that includes the content to the device 104U.

Functionality related to block 308 is discussed above with reference to FIG. 2, FIGS. 3A-C, and FIG. 4.

At block 402, the method 400 includes receiving, by the server 102, the request 206 from the device 104A for the device 104U to join the network 103A and/or the network 103B. In this context, the device 104A is included in the network 103A and in the network 103B. Functionality related to block 402 is discussed above with reference to FIG. 2 and FIG. 5.

At block 404, the method 400 includes making, by the server 102, determinations of whether to transmit the device 104U the credential corresponding to the network 103A and whether to transmit the device 104U the credential corresponding to the network 103B. Functionality related to block 404 is discussed above with reference to FIG. 2 and FIG. 5.

At block 406, the method 400 includes using the determinations as a basis to select, as content for the message 204, the credential corresponding to the network 103A, the credential corresponding to the network 103B, or the indication that the device 104U is not allowed on the network 103A and not allowed on the network 103B. Functionality related to block 406 is discussed above with reference to FIG. 2 and FIG. 5.

At block 408, the method 400 includes transmitting, to the device 104*a*, the instruction 208 to transmit the message 204 that includes the content. Functionality related to block 408 is discussed above with reference to FIG. 2 and FIG. 5.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to explain the principles of the examples, the practical application, and to enable others of ordinary skill in the art to understand the disclosure for various examples with various modifications as are suited to the particular use contemplated.

Although some of the acts and/or functions described in this disclosure have been described as being performed by a particular entity, the acts and/or functions can be performed by any entity, such as those entities described in this disclosure. Further, although the acts and/or functions have been recited in a particular order, the acts and/or functions need not be performed in the order recited. However, in some instances, it can be desired to perform the acts and/or functions in the order recited. Further, each of the acts and/or functions can be performed responsive to one or more of the other acts and/or functions. Also, not all of the acts and/or functions need to be performed to achieve one or more of the benefits provided by this disclosure, and therefore not all of the acts and/or functions are required.

Although certain variations have been discussed in connection with one or more examples of this disclosure, these variations can also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects as set forth in the following claims.

What is claimed is:

1. A method comprising:

receiving, by a first device that is included in a first network and a second network, a request from a second device to join the first network, wherein all devices that are included in the second network are included in the first network, and wherein the second network is a proprietary mesh network established by a manufacturer of the first device;

making, by the first device, determinations of whether to transmit the second device a first credential corresponding to the first network and whether to transmit the second device a second credential corresponding to the second network;

using the determinations as a basis to select, as content for a message, the first credential, the second credential, or an indication that the second device is not allowed on the first network and not allowed on the second network; and transmitting the message that includes the content to the second device.

2. The method of claim 1, wherein the second network also includes a gateway configured for communication with a server, and the first network also includes the gateway and a third device that is not included in the second network.

3. The method of claim 1, wherein receiving the request comprises receiving an identifier of the second device.

4. The method of claim 3, further comprising:

transmitting the identifier of the second device to a server; and receiving an instruction from the server to transmit the first credential and the second credential, wherein making the determinations comprises making the determinations based on the instruction, and wherein transmitting the message comprises transmitting the first credential and the second credential.

5. The method of claim 3, further comprising:

transmitting the identifier of the second device to a server; and receiving an instruction from the server to transmit the second credential but not the first credential, wherein making the determinations comprises making the determinations based on the instruction, and wherein transmitting the message comprises transmitting the second credential.

6. The method of claim 5, further comprising:

making an additional determination that a threshold duration has elapsed since transmitting the message without receiving a second instruction from the server to transmit the first credential to the second device; and changing the second credential in response to making the additional determination.

7. The method of claim 3, further comprising:

transmitting the identifier of the second device to a server; and receiving an instruction from the server to transmit neither the first credential nor the second credential, wherein making the determinations comprises making the determinations based on the instruction, and wherein transmitting the message comprises transmitting the indication that the second device is not allowed on the first network and not allowed on the second network.

8. The method of claim 1, wherein making the determinations comprises determining that a signal strength of the request exceeds a threshold signal strength, wherein transmitting the message comprises transmitting the first credential in response to making the determination.

9. The method of claim 1, wherein making the determinations comprises determining that a signal strength of the request exceeds a threshold signal strength, wherein transmitting the message comprises transmitting the second credential in response to making the determination.

10. The method of claim 1, wherein making the determinations comprises determining that a signal strength of the request does not exceed a threshold signal strength, wherein transmitting the message comprises transmitting the indication that the second device is not allowed on the first network and is not allowed on the second network.

11. The method of claim 1, wherein making the determinations comprises making the determinations based on the first device receiving an input via a user interface of the first device, wherein transmitting the message comprises transmitting the first credential and the second credential in response to receiving the input.

12. A non-transitory computer readable medium storing instructions that, when executed by one or more processors of a first device, cause the first device to perform functions comprising:

receiving, by the first device that is included in a first network and a second network, a request from a second device to join the first network, wherein all devices that are included in the second network are included in the first network, and wherein the second network is a proprietary mesh network established by a manufacturer of the first device;

making, by the first device, determinations of whether to transmit the second device a first credential corresponding to the first network and whether to transmit the second device a second credential corresponding to the second network;

using the determinations as a basis to select, as content for a message, the first credential, the second credential, or an indication that the second device is not allowed on the first network and not allowed on the second network; and transmitting the message that includes the content to the second device.

13. The non-transitory computer readable medium of claim 12, wherein receiving the request comprises receiving an identifier of the second device.

14. The non-transitory computer readable medium of claim 13, the functions further comprising:

transmitting the identifier of the second device to a server; and receiving an instruction from the server to transmit the first credential and the second credential, wherein making the determinations comprises making the determinations based on the instruction, and wherein transmitting the message comprises transmitting the first credential and the second credential.

15. The non-transitory computer readable medium of claim 13, the functions further comprising:

transmitting the identifier of the second device to a server; and receiving an instruction from the server to transmit the second credential but not the first credential, wherein making the determinations comprises making the determinations based on the instruction, and wherein transmitting the message comprises transmitting the second credential.

16. The non-transitory computer readable medium of claim 15, the functions further comprising:

making an additional determination that a threshold duration has elapsed since transmitting the message without receiving a second instruction from the server to transmit the first credential to the second device; and changing the second credential in response to making the additional determination.

17. The non-transitory computer readable medium of claim 13, the functions further comprising:

transmitting the identifier of the second device to a server; and receiving an instruction from the server to transmit neither the first credential nor the second credential, wherein making the determinations comprises making the determinations based on the instruction, and wherein transmitting the message comprises transmitting the indication that the second device is not allowed on the first network and not allowed on the second network.

18. The non-transitory computer readable medium of claim 12, wherein making the determinations comprises determining that a signal strength of the request exceeds a threshold signal strength, wherein transmitting the message comprises transmitting the first credential or the second credential in response to making the determination.

19. A first device comprising:

one or more processors; and a computer readable medium storing instructions that, when executed by the one or more processors, cause the first device that is included in a first network and a second network to perform functions comprising:

receiving, a request from a second device to join the first network, wherein all devices that are included in the second network are included in the first network, and wherein the second network is a proprietary mesh network established by a manufacturer of the first device;

making determinations of whether to transmit the second device a first credential corresponding to the first network and whether to transmit the second device a second credential corresponding to the second network;

using the determinations as a basis to select, as content for a message, the first credential, the second credential, or an indication that the second device is not allowed on the first network and not allowed on the second network; and transmitting the message that includes the content to the second device.

* * * * *